US007970342B1

(12) United States Patent
Griffin

(10) Patent No.: US 7,970,342 B1
(45) Date of Patent: Jun. 28, 2011

(54) DIGITAL MUSIC PLAYER ACCESSORY WITH DIGITAL COMMUNICATION CAPABILITY

(75) Inventor: Paul Griffin, Nashville, TN (US)

(73) Assignee: Griffin Technology Inc., Nashville, TN (US)

( * ) Notice: Subject to any disclaimer, the term of this patent is extended or adjusted under 35 U.S.C. 154(b) by 746 days.

(21) Appl. No.: 11/348,156

(22) Filed: Feb. 6, 2006

(51) Int. Cl.
*H04B 1/20* (2006.01)

(52) U.S. Cl. ...... 455/3.06; 455/3.05; 455/100; 455/345; 455/346

(58) Field of Classification Search .................. 455/11.1, 455/66, 42, 73, 93, 23, 95, 99, 205, 345, 455/3.05, 3.06, 414.1, 41.2, 100, 346; 369/6, 369/8
See application file for complete search history.

(56) References Cited

U.S. PATENT DOCUMENTS

| | | | |
|---|---|---|---|
| 5,428,827 A | 6/1995 | Kässer | 455/161.3 |
| 5,572,194 A | 11/1996 | Shiota | 340/825.3 |
| 5,790,958 A | 8/1998 | McCoy et al. | 455/557 |
| 5,987,382 A | 11/1999 | Weishaupt et al. | 701/211 |
| 6,038,434 A | 3/2000 | Miyake | 455/186.1 |
| 6,067,447 A | 5/2000 | Zucker | 455/69 |
| 6,141,536 A | 10/2000 | Cvetkovic et al. | 455/45 |
| 6,161,002 A | 12/2000 | Migliaccio et al. | 455/150 |
| 6,163,711 A | 12/2000 | Juntunen et al. | 455/557 |
| 6,463,469 B1 | 10/2002 | Yavitz | 709/219 |
| 6,591,085 B1* | 7/2003 | Grady | 455/42 |
| 6,661,292 B2 | 12/2003 | Gierl et al. | 331/1 |
| 6,704,554 B1 | 3/2004 | Gerrits | 455/205 |
| 6,711,390 B1 | 3/2004 | Moers | 455/186.1 |
| 6,847,802 B2 | 1/2005 | Migliaccio | 455/45 |
| 6,957,041 B2 | 10/2005 | Christensen et al. | 455/3.1 |
| 6,978,026 B2 | 12/2005 | Hildebrandt et al. | 391/2 |
| 7,054,653 B2 | 5/2006 | Järvi et al. | 455/466 |
| 2003/0236075 A1* | 12/2003 | Johnson et al. | 455/99 |
| 2005/0054379 A1* | 3/2005 | Cao et al. | 455/556.1 |
| 2005/0090279 A9* | 4/2005 | Witkowski et al. | 455/550.1 |
| 2005/0228520 A1* | 10/2005 | Yeh | 700/94 |
| 2005/0286481 A1* | 12/2005 | Fadell | 370/342 |
| 2006/0093155 A1* | 5/2006 | Fiori et al. | 381/86 |
| 2006/0094349 A1* | 5/2006 | Slesak et al. | 455/3.02 |
| 2006/0116009 A1* | 6/2006 | Langberg et al. | 439/76.1 |
| 2006/0134959 A1* | 6/2006 | Ellenbogen | 439/297 |
| 2006/0156349 A1* | 7/2006 | Naghi et al. | 725/75 |
| 2006/0156415 A1* | 7/2006 | Rubinstein et al. | 726/27 |
| 2007/0025561 A1* | 2/2007 | Gauger et al. | 381/71.6 |
| 2007/0049197 A1* | 3/2007 | Klein | 455/41.2 |
| 2007/0077784 A1* | 4/2007 | Kalayjian et al. | 439/61 |
| 2007/0206827 A1* | 9/2007 | Tupman et al. | 381/334 |
| 2008/0125031 A1* | 5/2008 | Fadell et al. | 455/3.06 |
| 2009/0018682 A1* | 1/2009 | Fadell et al. | 700/94 |

\* cited by examiner

*Primary Examiner* — Dominic E Rego
(74) *Attorney, Agent, or Firm* — Hornkohl Intellectual Property Law, PLLC; Jason L. Hornkohl

(57) ABSTRACT

An accessory for a digital music player establishes bidirectional communications between the digital music player and a remote receiver. The bidirectional communication channel allows song information such as the title, artist and album to be transferred from the digital music player to the remote receiver. This information is then displayed by the remote receiver. The accessory also transmits an FM audio signal to the receiver based upon an audio signal received from the digital music player such that music from the player can be played over the remote receiver. The bidirectional communication channel allows the controls of the remote receiver's controls to be used to control the music being played by the digital music player. The commands and digital information are preferably transferred between the digital music player and the remote receiver in accordance with a Radio Data System or Radio Broadcast Data System format.

11 Claims, 3 Drawing Sheets

Block diagram of device

*Block diagram of device*

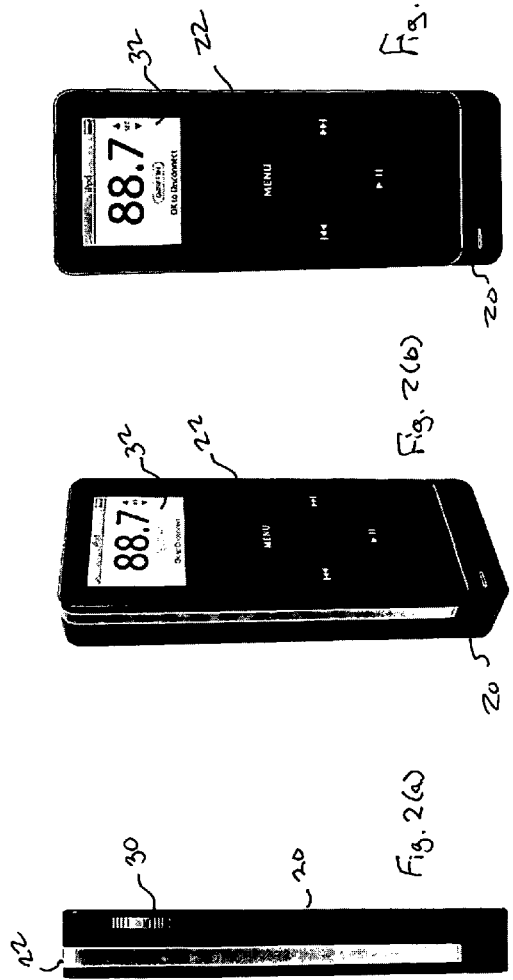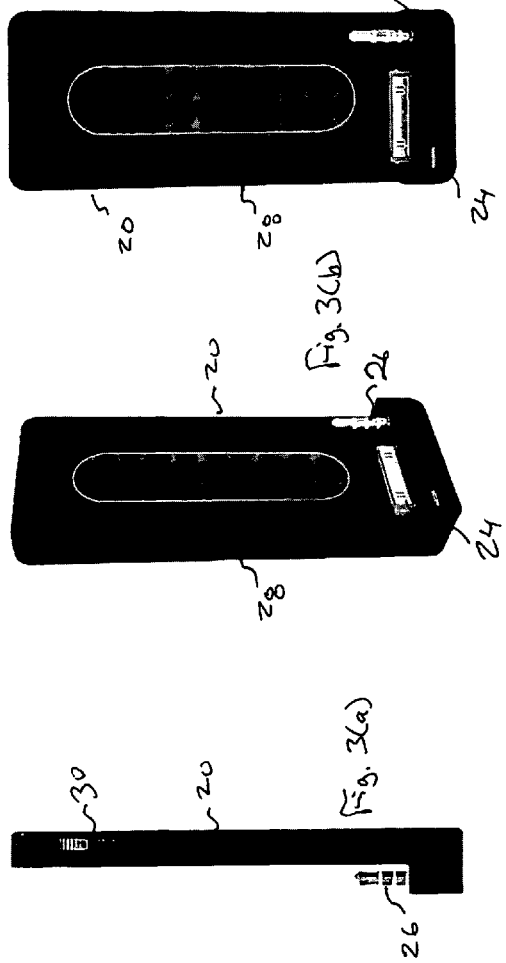

DIGITAL MUSIC PLAYER ACCESSORY WITH DIGITAL COMMUNICATION CAPABILITY

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Radio Data Broadcast System (RDBS) and Radio Data System (RDS) are similar technologies (hereinafter jointly referred to as "RDS") that provide for the transfer of digital data to a frequency modulated (FM) broadcast receiver. The RDBS standard is typically used in the United States while the RDS standard is typically used in Europe. These systems standardize several types of transmitted information. For example, RDS technology allows radio stations to transmit information via encoded digital signals that is received and displayed on the user's radio. Thus, an RDS-capable radio can display the title and artist or current song playing, local traffic information, an advertiser's phone number while a commercial is playing, etc. In addition, a listener who is traveling or commuting in a vehicle can arrange to have special traffic bulletins break into programs automatically, even if the traffic information is broadcast by a station other than the one the listener is tuned to at the moment. For this reason, FM broadcast receivers equipped with RDS capability are sometimes called "smart radios".

BRIEF SUMMARY OF THE INVENTION

An embodiment of the present invention is directed toward an accessory for use with a digital music player. The accessory includes a transmitter for transmitting digital data to a remote receiver such that a display of the remote receiver displays information corresponding to the transmitted digital data. The digital data is preferably information in a Radio Data System (RDS) or Radio Broadcast Data System (RBDS) format that concerns a song being played by the remote receiver. The accessory also receives an audio output signal from the digital music player and transmits a frequency modulated version of the audio signal to the remote receiver such that the remote receiver produces music based upon the audio signal. In addition, the accessory includes a receiver that receives digital information from the remote receiver and transfers the digital data to the digital music player. The received digital information allows a user to control a function of the digital music player by manipulating a control of the remote receiver.

Another embodiment of the present invention is directed toward an accessory for a digital music player. The accessory includes a bidirectional transceiver for establishing digital communications between the digital music player and a remote receiver. An analog FM transmitter transmits an audio signal from the digital music player to the remote receiver. In addition, the accessory preferably transmits information concerning a song being played on the digital music player to the remote receiver. The accessory alters a format of information received from the digital music player before transferring the information to the remote receiver. The accessory receives command instructions from the remote receiver and communicates the command instructions to the digital music player such that the digital music player performs a function corresponding to the command instructions.

Yet another embodiment of the present invention is directed toward a device for use with a digital music player. The device includes an FM transmitter for transferring an audio signal from the digital music player to a remote receiver and a receiver for receiving information from the remote receiver. A decoder in the device receives digital information from the digital music player, encodes the digital information into a format readable by the remote receiver and transfers the encoded information to the FM transmitter for transmission to the remote receiver. The digital information is preferably encoded based upon a Radio Data System or Radio Broadcast Data System format and concerns a song being played by the digital music player. The remote receiver is preferably a car radio that alters a display based upon the encoded information. In addition, the device enables a control on the car stereo to be used to control a function of the digital music player.

BRIEF DESCRIPTION OF THE SEVERAL VIEWS OF THE DRAWINGS

FIGS. 2(a-c) are illustrations of an RDS capable accessory constructed in accordance with an embodiment of the present invention coupled to a digital music player;

FIGS. 3(a-c) are illustrations of the RDS capable accessory of FIGS. 2(a-c) uncoupled from a digital music player.

DETAILED DESCRIPTION OF THE INVENTION

Figure 1:
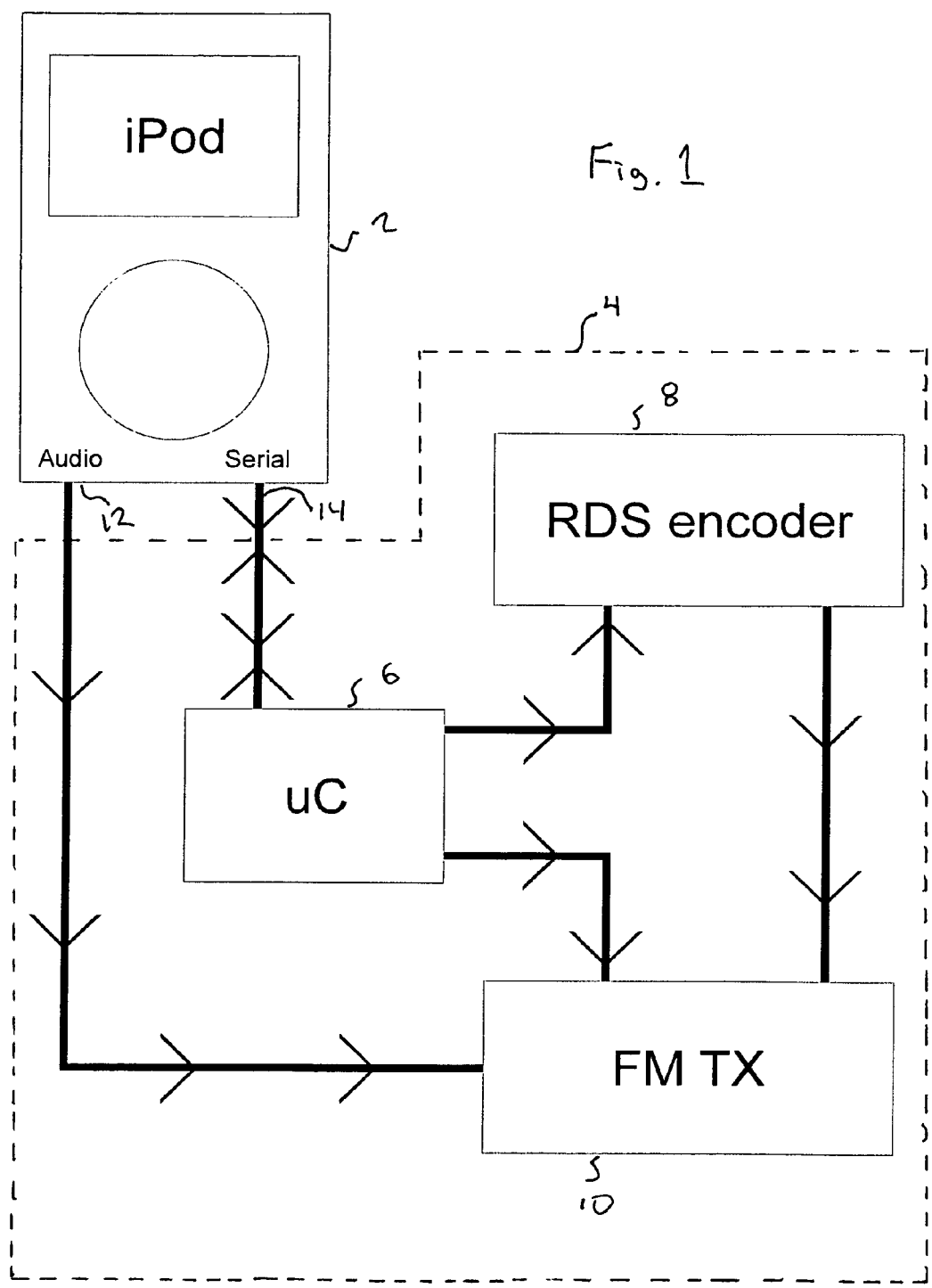
FIG. 1 is a functional block diagram of a RDS capable accessory for a digital music player.

Referring now to FIG. 1, a functional block diagram of an RDS capable accessory 4 for use with a digital music player 2 is shown. The accessory shown includes a microprocessor 6, an RDS encoder 8 and an FM transmitter 10. While the term RDS is used, it will be understood that the present invention could be used in conjunction with any type of digital information encoding scheme and the present invention is not limited to use with the RDS or RDBS encoding schemes. The accessory 4 physically connects to the digital music player 2 through a communication port. This connection allows the accessory 4 to perform two primary functions. First, the accessory 4 transfers analog audio from the digital music player 2 to the FM transmitter circuit 10 such that it can be sent to a remote receiver. Second, the accessory 4 allows for bidirectional digital communications between the remote receiver and the digital music player 2 such that a user can select options on the digital music player 2 through the use of the remote receiver controls and the digital music player 2 can send digital file information to the remote receiver.

In a preferred embodiment, the audio signal from the digital music player 2 is received from the audio output port 12 of the digital music player 2. The FM transmitter 10 then transmits a frequency modulated (FM) version of the signal to a remote receiver such as a car stereo such that a user can listen to the audio output of the digital music player over their car stereo speakers. The accessory 4 preferably communicates digitally with the digital music player 2 through a digital output 14 such as the 30 pin connector used on the Apple iPod™.

The ability of the accessory 4 to transfer digital information between the remote receiver and the digital music player 2 enables a number of additional features. For example, the song, artist and album information concerning a song playing on the digital music player 2 can be transferred to a remote stereo by the accessory 4 such that the song information is displayed on a display of the stereo. In addition, commands from the remote stereo can also be transferred through the accessory 4 to the digital music player 2 such that the controls on the stereo can be used to control the playing of the sing on the digital music player 2.

Multiple file formats are supported by various digital music players, and not all file formats provide additional file information that can be conveyed by the digital music player. However, file formats that do provide additional file information such as MP3 "ID3" tags provide a variety of data such as song name, artist name, album name, runtime, elapsed time, etc. Thus, in the case Of the MP3 ID3 tags, useful information is provided that can be displayed by an RDS-capable FM radio receiver. The present invention is not limited to use with MP3 ID3 tags and can be used with any type of data format, such as voice memo recordings, or iPod-compatible video files, that provides a particular type of data which it would be useful to display or transfer. For example, the date of creation for a voice memo or the width and height of a video file may be transferred in accordance with an embodiment of the present invention. A particularly preferred embodiment of the present invention is designed to be forward-compatible with new file types and control interfaces that may potentially be incorporated by Apple™ (creator of the iPod™), because requesting and handling such data is defined and controlled by the iPod according to Apple's own forward-compatible standards, and is in no way limited to MP3 ID3 tags or any other currently supported iPod file formats.

Referring now to FIGS. 2(a-c) and 3(a-c), side (a), perspective (b) and frontal (c) views of an accessory 20 constructed in accordance with an embodiment of the present invention are shown with, FIG. 2, and without, FIG. 3, a digital music player 22 mounted thereon. Those skilled in the art will recognize that the present invention could be embodied in a variety of physical forms and that the embodiment of FIGS. 2 and 3 is only exemplary. The accessory 20 is coupled to the bottom of the digital player 22 so that it can transfer data to and from the digital music player 22 using its digital 24 and analog 26 outputs. The accessory 20 has sled shaped housing 28 that is designed to be coupled with the digital music player 22 such that the accessory and the digital music player function, and can be carried, as a single unit. In the preferred embodiment shown in FIGS. 2 and 3, the iPod Nano™ slides into the iTrip™ accessory 20 and securely connects via the iPod's dock and headphone connectors. A user input such as a three position toggle switch 30 is provided on the accessory to allow a user to select an FM frequency on which to broadcast the audio signal received from the digital music player 22. In addition, the toggle switch 30 allows the user to manipulate menus displayed on a video screen 32 of the digital music player 22 that is coupled to the FM transmitting accessory 20. By selecting the proper menus, digital music player 22 functions, such as the volume, operating mode, display, etc., can be controlled through manipulation of the toggle switch 30. The housing 28 contains the transmitter that allows the accessory 20 to establish bidirectional communications with a remote receiver such as an FM stereo such that digital information can be transferred between the accessory 20 and the remote receiver. This digital information, such as the song, artist or album, can then be displayed on the display of the remote receiver or the digital music player 22.

While a toggle switch is shown on the embodiment of FIGS. 2 and 3, it will be readily appreciated by those skilled in the art that any suitable user interface 30 could be used. Also, in the embodiment shown, an USB connector 26 and 30 pin connector 24 are used to electrically and physically couple the accessory 20 to the digital music player 22. However, it will be readily appreciated by those skilled in the art that the connectors 24 and 26 on the accessory 20 may be altered to accommodate the connectors on the digital music player 22.

Figure 4:
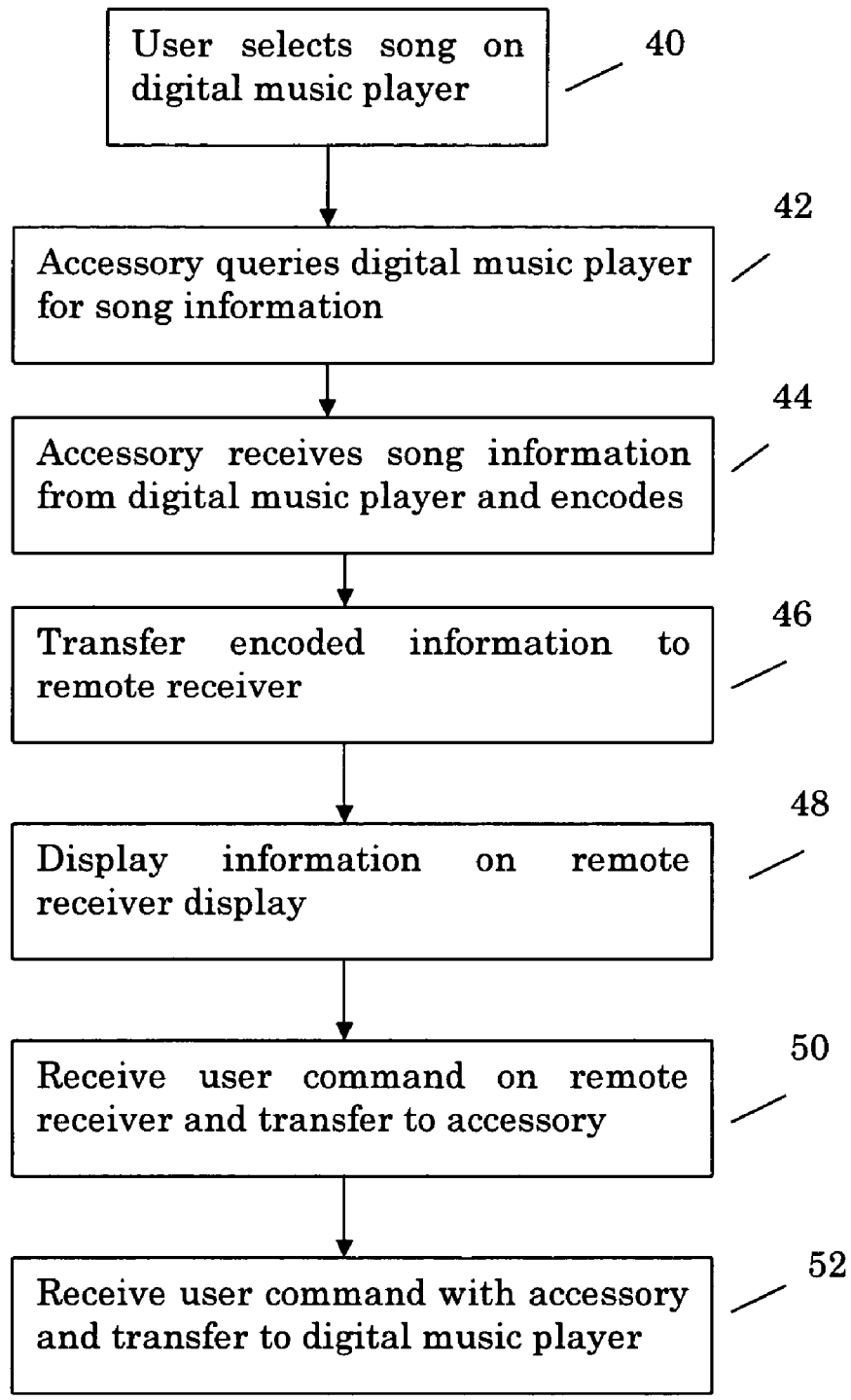
FIG. 4 is a flow chart of a method of transferring RDS data between a digital music player and an FM transmitting accessory in accordance with an embodiment of the present invention.

Referring now to FIG. 4, a flow chart of an exemplary method of transferring information from the digital music player to the display of a remote receiver is shown. The method begins with a user selecting a song on the digital music player in step 40. In response to the song being selected, the accessory queries the digital music player for information such as the song artist or title in step 42. In step 44, the accessory receives the requested information from the digital music player and encodes the information into an accepted format such as an RDS or RDBS radio format. The information is then transferred to a remote receiver using a transmitter or physical coupling in step 46. The remote receiver recognizes the formatted information and alters its display to reflect the received information in step 48. The remote receiver may also send commands and information to the accessory as set forth in step 50. In step 52, the accessory decodes the commands and information, if necessary, and relays the commands and digital information to the digital music player. The information may concern the status of the remote receiver or music being played. The commands may be used to allow the controls on the remote receiver such as a car radio to control the music being played by the digital music player. For example, a car stereo's controls could be used to raise the volume from the digital music player or to pause the song playing on the digital music player.

Although there have been described particular embodiments of the present invention of a new and useful DIGITAL MUSIC PLAYER ACCESSORY WITH DIGITAL COMMUNICATION CAPABILITY, it is not intended that such references be construed as limitations upon the scope of this invention except as set forth in the following claims.

What is claimed is:

1. An accessory for use with a digital music player, said accessory comprising:
   an interface that receives an audio output signal from said digital music player and produces an analog FM broadcast frequency modulated audio signal based upon said audio output signal;
   an encoder that receives device generated digital data concerning said audio output from said digital music player and encodes said device generated digital data into encoded digital data in a digital FM broadcast format; and
   a wireless transmitter for simultaneously wirelessly transmitting said encoded digital data to a remote FM receiver in a portion of an FM frequency band allocated to digital broadcast radio data and transmitting said analog FM broadcast frequency modulated audio signal to a remote FM receiver in a portion of said FM frequency band allocated to analog broadcast signals such that said remote FM receiver decodes said frequency modulated audio signal into an audio signal and produces audio based upon said audio signal and a display of said remote FM receiver displays music information corresponding to said transmitted encoded digital data.

2. The accessory of claim 1 wherein said digital data is in a Radio Data System or Radio Broadcast Data System format.

3. The accessory of claim 1 further comprising a receiver for receiving digital information from said remote FM receiver and transferring said digital data to said digital music player.

4. The accessory of claim 3 wherein said digital information allows a user to control a function of said digital music player by manipulating a control of said remote FM receiver.

5. An accessory for a portable digital music player comprising:
- an FM modulator and transmitter that receive an audio signal from said digital music player, produce an analog frequency modulated signal based upon said received audio signal and broadcast said analog frequency modulated signal in a broadcast radio FM frequency band to a remote FM receiver;
- a bidirectional transceiver for establishing wireless digital communications in a portion of an FM frequency band allocated to digital broadcast radio data between said digital music player and said remote FM receiver such that digital information concerning said audio signal from said digital music player can be simultaneously displayed on a display of said remote FM receiver with a playing of said audio signal by said remote FM receiver; and
- a housing that contains said FM modulator and transmitter and said bidirectional transceiver that physically couples to said portable digital music player so that said portable digital music player and said accessory can be carried and function as a single unit.

6. The accessory of claim 5 wherein said accessory receives command instructions from said remote FM receiver and communicates said command instructions to said digital music player such that said digital music player performs a function corresponding to said command instructions.

7. A device for use with a digital music player comprising:
- an FM transmitter for wirelessly transmitting in an FM broadcast radio frequency band an analog audio signal from said digital music player to a remote FM receiver; and
- a decoder for receiving digital display information concerning said analog audio signal from said digital music player, encoding said digital display information into a digital FM broadcast radio format readable by said remote FM receiver and transferring said encoded display information to said FM transmitter for transmission to said remote FM receiver in a portion of said FM frequency band allocated to digital broadcast radio data simultaneously with said wireless transmission of said analog audio signal.

8. The device of claim 7 wherein said digital information is encoded based upon a Radio Data System or Radio Broadcast Data System format.

9. The device of claim 7 wherein said remote FM receiver is a car radio and said car radio alters a radio display based upon said encoded information.

10. The device of claim 7 further comprising a receiver for receiving information from said remote FM receiver.

11. The device of claim 10 wherein said remote FM receiver is a car stereo and said device enables a control of said car stereo to be used to control a function of said digital music player.

* * * * *